United States Patent
Lee et al.

(10) Patent No.: US 9,985,474 B2
(45) Date of Patent: May 29, 2018

(54) DISPLAY APPARATUS AND POWER SUPPLYING METHOD THEREOF

(71) Applicant: SAMSUNG ELECTRONICS CO., LTD., Suwon-si (KR)

(72) Inventors: Sang-Hoon Lee, Suwon-si (KR); Jeong-il Kang, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days. days.

(21) Appl. No.: 14/794,924

(22) Filed: Jul. 9, 2015

(65) Prior Publication Data
US 2016/0036271 A1 Feb. 4, 2016

(30) Foreign Application Priority Data

Aug. 1, 2014 (KR) .................. 10-2014-0099159

(51) Int. Cl.
*G06F 3/038* (2013.01)
*H02J 9/06* (2006.01)
*G09G 3/34* (2006.01)

(52) U.S. Cl.
CPC ............ *H02J 9/065* (2013.01); *G09G 3/3406* (2013.01); *G09G 2330/04* (2013.01)

(58) Field of Classification Search
CPC . G09G 2330/02–2330/12; G09G 3/006; H02J 9/04; H02J 9/065; H05B 33/0884
See application file for complete search history.

(56) References Cited

U.S. PATENT DOCUMENTS

| | | | |
|---|---|---|---|
| 8,680,786 B2* | 3/2014 | Choi | G09G 3/3406 315/247 |
| 8,686,645 B2 | 4/2014 | Koo et al. | |
| 8,917,033 B2 | 12/2014 | Xu et al. | |
| 8,928,231 B2 | 1/2015 | Campos et al. | |
| 2006/0290701 A1* | 12/2006 | Masaki | G09G 3/006 345/520 |
| 2009/0203965 A1* | 8/2009 | Fujiyama | A61B 1/00096 600/130 |
| 2011/0049985 A1* | 3/2011 | Fukute | H02M 3/156 307/31 |
| 2012/0038290 A1* | 2/2012 | Choi | G09G 3/3406 315/293 |
| 2012/0062148 A1* | 3/2012 | Kim | H05B 33/0815 315/297 |
| 2012/0105518 A1* | 5/2012 | Kang | G09G 3/3426 345/694 |
| 2012/0162279 A1* | 6/2012 | Kim | G09G 3/3406 345/690 |
| 2013/0099690 A1* | 4/2013 | Kim | G09G 3/3406 315/210 |
| 2013/0106292 A1 | 5/2013 | Koo et al. | |

(Continued)

*Primary Examiner* — Roberto Flores
(74) *Attorney, Agent, or Firm* — Sughrue Mion, PLLC (57) ABSTRACT

Disclosed are a display apparatus and a power supplying method thereof. The display apparatus includes: a backlight driver configured to drive a backlight to emit light; a main power supply configured to detect connection of the backlight to the backlight driver and supply a voltage to the backlight driver in response to a control voltage; and a standby power supply configured to supply the control voltage to the main power supply, in response to determining the connection of the backlight to the backlight driver.

10 Claims, 6 Drawing Sheets

(56) References Cited

U.S. PATENT DOCUMENTS

| | | | |
|---|---|---|---|
| 2013/0113380 A1* | 5/2013 | Kim | G09G 3/3406 |
| | | | 315/121 |
| 2013/0113844 A1* | 5/2013 | Kim | H05B 33/0887 |
| | | | 345/690 |
| 2013/0140990 A1 | 6/2013 | Campos et al. | |
| 2013/0307416 A1 | 11/2013 | Xu et al. | |
| 2014/0077703 A1* | 3/2014 | Chen | H05B 33/0803 |
| | | | 315/120 |
| 2015/0077014 A1* | 3/2015 | Ng | H05B 33/0818 |
| | | | 315/294 |
| 2015/0154921 A1* | 6/2015 | Zhang | G09G 3/3426 |
| | | | 315/297 |
| 2016/0036271 A1* | 2/2016 | Lee | H02J 9/065 |
| | | | 345/211 |

* cited by examiner

DISPLAY APPARATUS AND POWER SUPPLYING METHOD THEREOF

CROSS-REFERENCE TO RELATED APPLICATION

This application claims priority from Korean Patent Application No. 10-2014-0099159, filed on Aug. 1, 2014 in the Korean Intellectual Property Office, the entire disclosure of which is incorporated herein by reference.

BACKGROUND

Field

Apparatuses and methods consistent with exemplary embodiments relate to a display apparatus and a power supplying method thereof, and more particularly to a display apparatus and a power supplying method thereof, which can prevent damage to a circuit component even though an alternating current (AC) power plug is connected without a backlight or a video circuit during assembly or a test process.

Description of Related Art

A display apparatus, such as a television (TV), operates by receiving power from an internal or external power supply. The display apparatus includes a plurality of components, such as a video circuit, a backlight driver, a backlight, an audio reproducer, and the like, to which electric power may be supplied.

Figure 6:
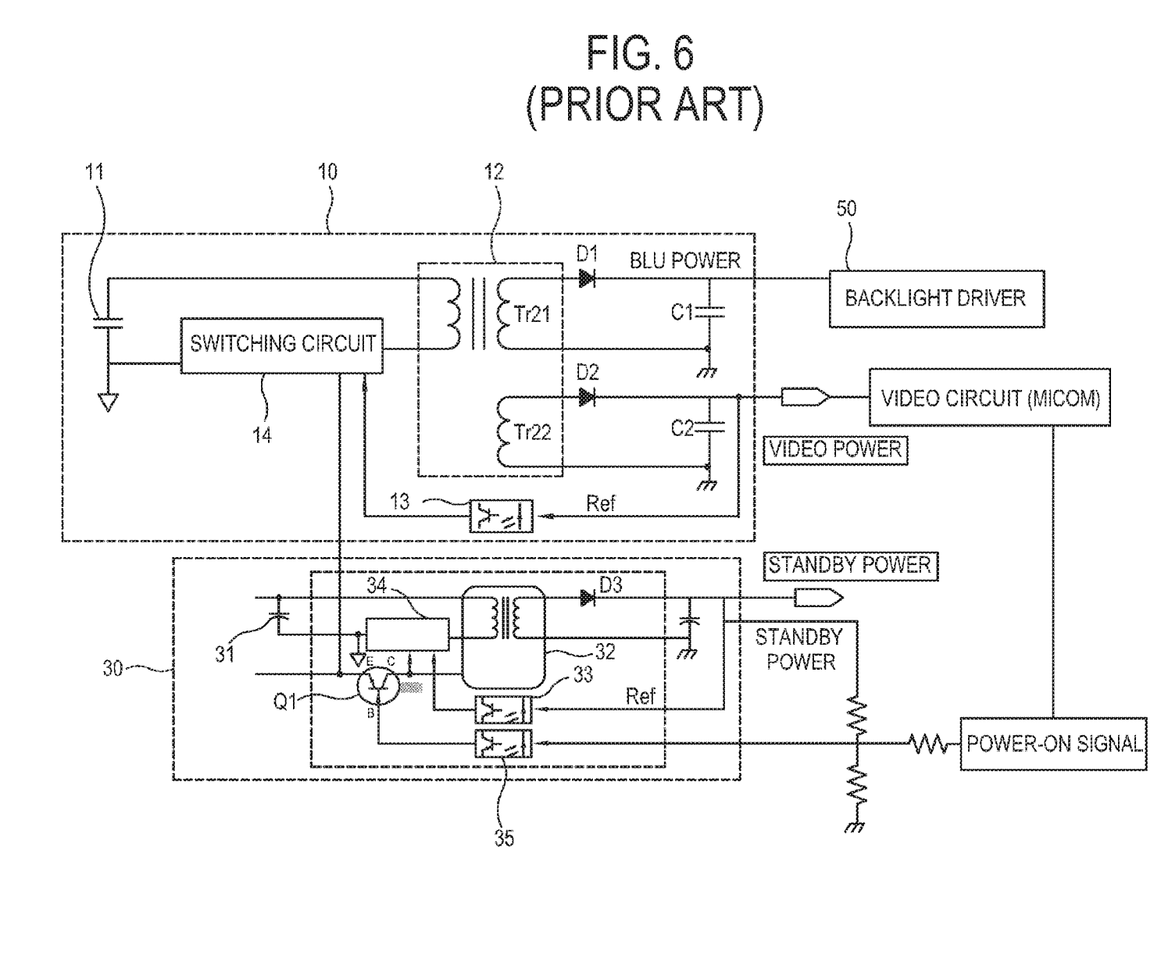
FIG. 6 is a circuit diagram illustrating a conventional display apparatus.

FIG. 6 is a circuit diagram illustrating a power supplying structure of a general display apparatus.

The display apparatus includes a main power supply 10 which converts an input voltage into voltages needed for respective components and supplies the converted voltages to the respective components. The display apparatus also includes a standby power supply 30 which generates standby power while the display apparatus is in a standby mode and controls the main power supply 10 to turn on in response to a power-on signal. As shown in FIG. 6, if the power-on signal is input via a photo coupler 35 of the standby power supply 30, a transistor switch Q1 is switched on and off, so that the standby power supply 30 can supply a control voltage to a switching integrated circuit (IC) 14 in order to control the main power supply 10.

In general, assembly or testing may be performed by supplying an AC voltage to the display apparatus while the video circuit is absent. If the video circuit is absent, a power-on signal may not be transmitted from the video circuit. During assembly or testing, the main power supply 10 must operate even though the video circuit is absent. Therefore, as shown in FIG. 6, the output terminal of the standby power supply 30 is connected to the power-on signal input terminal of the video circuit, so that the main power supply 10 can operate whenever an AC voltage is supplied.

However, as the power is supplied to the respective components of the display apparatus when the AC power is supplied without a connection between the backlight and the video circuit, the circuit may be damaged.

In particular, abnormal discharge of electric charges stored in a capacitor, or similar energy storage element, may damage the circuit components.

SUMMARY

An aspect of an exemplary embodiment provides a display apparatus and a power supplying method thereof, that can selectively supply a control voltage to a main power supply based on a connection status between a backlight and a backlight driving circuit, and to prevent damage to a circuit component from occurring when power is supplied while a backlight is disconnected.

According to an exemplary embodiment, a display apparatus for displaying an image, the display apparatus includes: a backlight driver configured to drive a backlight to emit light; a main power supply configured to supply a voltage to the backlight driver in response to a control voltage; and a standby power supply configured to detect connection of the backlight to the backlight driver and supply the control voltage to the main power supply, in response to detecting the connection of the backlight to the backlight driver.

The standby power supply may be further configured to determine whether a video circuit is connected to the display apparatus, and supply the control voltage in accordance with a result of the determination.

The standby power supply may be further configured to determine whether a video circuit is connected to the display apparatus and supply a power-on signal to the video circuit in accordance with a result of the determination.

The display apparatus may further include a wire harness including a first side and a second side configured to connect the backlight to the backlight driver.

The first side of the wire harness may include a first terminal connected to an output terminal of the standby power supply and a second terminal connected to a bias control-voltage input terminal of the main power supply, the second side of the wire harness may include a third terminal configured to be coupled to the first terminal and a fourth terminal configured to be coupled to the second terminal, and the third terminal and the fourth terminal may be directly electrically connected to each other.

According to another aspect of an exemplary embodiment, a power supplying method of a display apparatus with a standby power supply and a main power supply, the power supplying method includes: by the standby power supply, generating standby power based on an input alternating current power; connecting a backlight driver to a backlight; and by the standby power supply, detecting connection of the backlight to the backlight driver and based on the detecting, supplying the generated standby power as a control voltage to the main power supply.

The power supplying method may further include determining whether a video circuit is connected to the display apparatus, and supplying the control voltage in accordance with a result of the determining.

The power supplying method may further include determining whether a video circuit is connected to the display apparatus and supplying the control voltage in accordance with a result of the determination.

According to an aspect of another exemplary embodiment, a display apparatus includes: a backlight driver comprising a backlight connection harness, the backlight driver configured to drive a backlight connected via the backlight connection harness; a standby power supply configured to generate and output a standby voltage to the backlight connection harness.

The standby power supply may be further configured to receive the standby voltage from the wiring harness.

The display apparatus may further include a main power supply. The standby power supply may be further configured to activate the main power supply in response to receiving the standby voltage from the backlight connection harness.

The display apparatus may further include a video circuit configured to generate an activation signal. The standby power supply may be further configured to activate the main power supply in response to receiving the activation signal received from the video circuit.

The video circuit may include a remote-controller light receiver configured to generate an indicator signal in response to receiving a power command from a remote control, and the video circuit may be further configured to generate the activation signal in response to the indicator signal.

BRIEF DESCRIPTION OF THE DRAWINGS

The above and/or other aspects will become apparent and more readily appreciated from the following description of exemplary embodiments, taken in conjunction with the accompanying drawings, in which.

DETAILED DESCRIPTION OF EXEMPLARY EMBODIMENTS

Below, exemplary embodiments will be described in detail with reference to the accompanying drawings. The following exemplary embodiments describe configurations related to the present disclosure, and the descriptions of other configurations may be omitted. Further, like numerals refer to like elements throughout. Expressions such as "at least one of," when preceding a list of elements, modify the entire list of elements and do not modify the individual elements of the list. In describing exemplary embodiments, the term "connected to" or "coupled to" that is used to designate a connection or coupling of one element to another element includes both a case that an element is "directly connected or coupled to" another element and a case that an element is connected or coupled to another element via still another element. In this case, the term "directly connected to" or "directly coupled to" means that an element is connected or coupled to another element without intervention of any other element.

Figure 1:
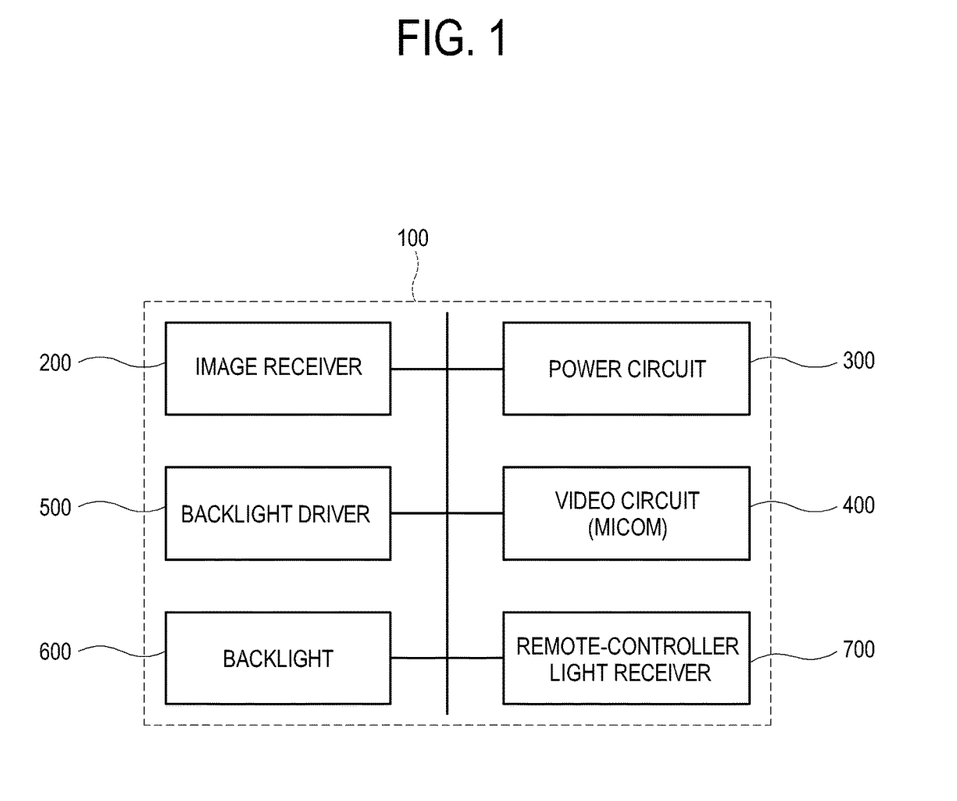
FIG. 1 is a block diagram schematically illustrating a display apparatus according to an exemplary embodiment.

According to an exemplary embodiment, as shown in FIG. 1, a display apparatus 100 may include an image receiver 200, a power circuit 300, a video circuit 400, a backlight driver 500, a backlight 600, and a remote-controller light receiver 700. In addition to the foregoing elements, the display apparatus 100 may further include a graphic processor, a storage, a user interface generator, an audio processor, a wired/wireless communicator, etc., descriptions of which will be omitted for convenience.

The image receiver 200 may include a tuner connected to an external antenna. The image receiver 200 receives a television (TV) broadcast through the antenna under control of a microcomputer, performs a predetermined signal-amplification process or the like, extracts an image signal from the TV broadcast signal, and outputs the image signal to the video circuit 400. Additionally, the image receiver 200 may receive the TV broadcast from a cable or satellite signal.

The power circuit 300 may include a main power supply 310 which normally supplies a control voltage to the display apparatus 100 after receiving a power-on signal from the video circuit 400, and a standby power supply 330 which supplies power to the display apparatus 100 while in a standby mode.

For example, the main power supply 310 may supply voltages for the backlight driver 500 and the video circuit 400.

The standby power supply 330 may supply standby power as the control voltage for controlling the main power supply 310 when the backlight 600 is connected to the backlight driver. That is, if the backlight 600 is connected to the backlight driver, the standby power output from the standby power supply 330 is used as a bias voltage, so that the standby power can be supplied as the control voltage to the main power supply 310.

The video circuit 400 may include a microcomputer for generally controlling the elements of the display apparatus 100. The microcomputer detects a power-on signal received through the remote-controller light receiver 700, and uses the power-on signal as a bias voltage for controlling the standby power supply 330, so that the standby power supply 330 can supply the standby power as the control voltage to the main power supply 310.

The video circuit 400 may include one or more video processors to process display image data. The image data may be received from an external source or stored image data. For example, the video processing may include scaling for enlarging or reducing the size of image in accordance with given resolutions, decoding and encoding corresponding to various image formats, de-interlacing, frame refresh rate conversion, noise reduction for improving image quality, detail enhancement, line scanning, or any other processing. The processes may be performed individually or simultaneously.

The backlight 600 emits light to the back of a liquid crystal display (LCD) panel, and may include a light emitting diode (LED), a cold cathode fluorescent lamp (CCFL), or the like. The backlight 600 may directly emit light from the back of the LCD panel or may emit light to an edge, so that the light can be guided through a light guide plate toward the back of the LCD panel.

The backlight driver 500 applies driving power to the backlight 600. The backlight driver 500 may drive the backlight 600 based on a dimming signal and a lighting signal received from a timing controller. Further, the backlight driver 500 may control the backlight 600 to emit white light.

The remote-controller light receiver 700 may receive a command issued by a user through a remote controller. Alternatively, for example, a power-on signal may be received from the display apparatus 100. A user's command received through the remote-controller light receiver 700 may be identified and processed by the microcomputer of the video circuit 400. That is, the microcomputer of the video circuit 400 receives the power-on signal from the remote-controller light receiver 700, provides the power-on signal as the bias control voltage to the standby power supply 330 so that the standby power supply 330 can supply the standby power to the main power supply 310 and thus the main power supply 310 can supply voltages to the respective components of the display apparatus 100.

Figure 2:
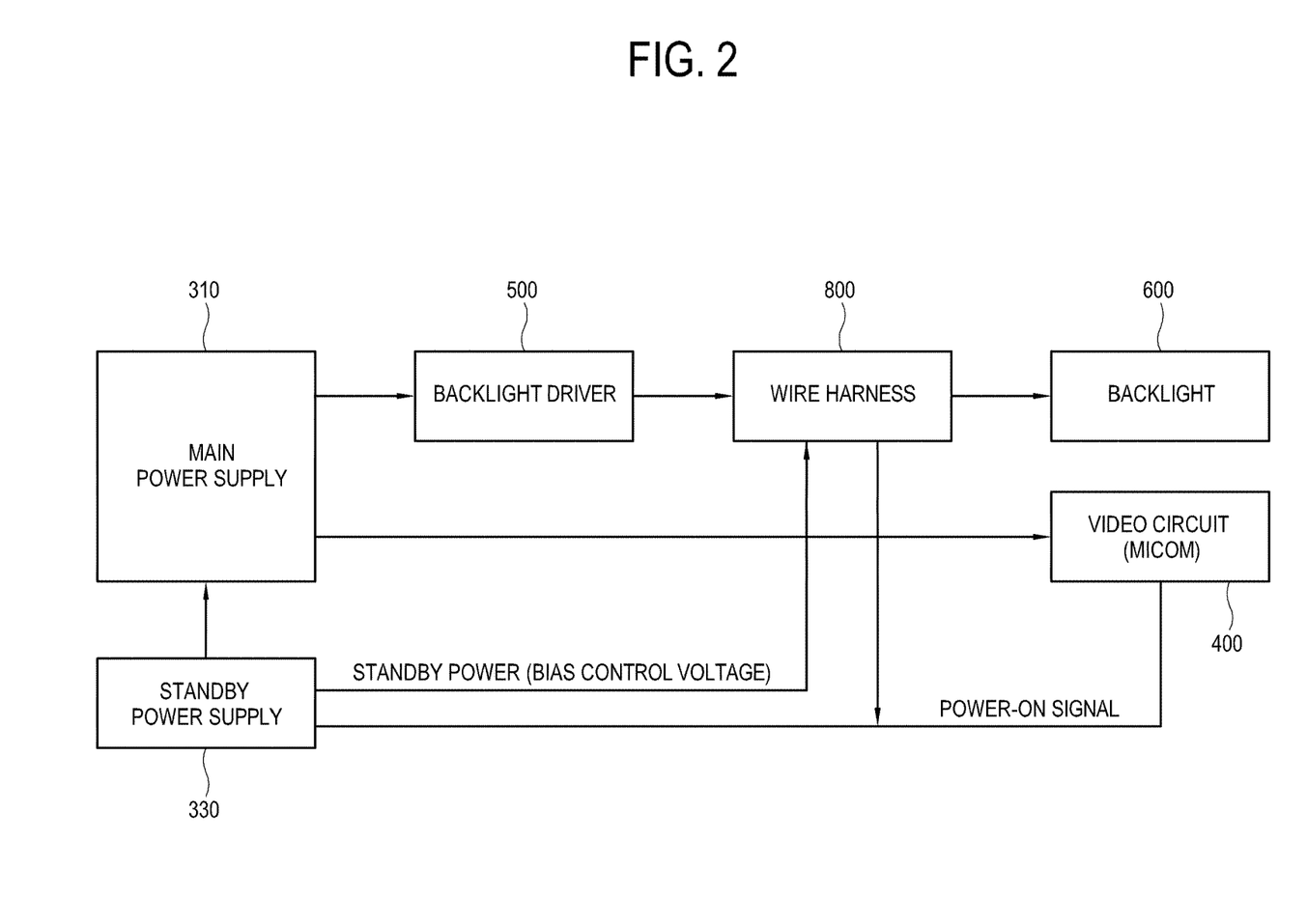
FIG. 2 is a block diagram illustrating power connections to respective components according to an exemplary embodiment.

FIG. 2 is a block diagram of illustrating power connections to respective components of the display apparatus 100.

The respective components include, for example, the backlight 600 and the video circuit 400. The main power supply 310 may supply the control voltage to another component not shown in FIG. 2.

As shown in FIG. 2, the main power supply 310 of the power circuit 300 may supply the control voltage to the backlight 600 via the backlight driver 500, and also supply the control voltage to the video circuit 400. The backlight driver 500 may connect to the backlight 600 through the wire harness 800.

The standby power supply 330 of the power circuit 300, in accordance with a bias control voltage, may supply the control voltage to the main power supply 310 to control the main power supply 310. The bias control voltage may be provided as the power-on signal from the microcomputer of the video circuit 400, and may be provided as the standby power of the output terminal of the standby power supply 330 when the backlight 600 is connected to the backlight driver 500. At this time, when the backlight 600 is connected to the backlight driver 500, the wire harness 800 may be used for supplying the standby power of the output terminal of the standby power supply 330 as the bias control voltage.

Below, the power supplying structure of the display apparatus 100 according to an exemplary embodiment will be described in detail with reference to FIGS. 3 and 4.

Figure 3:
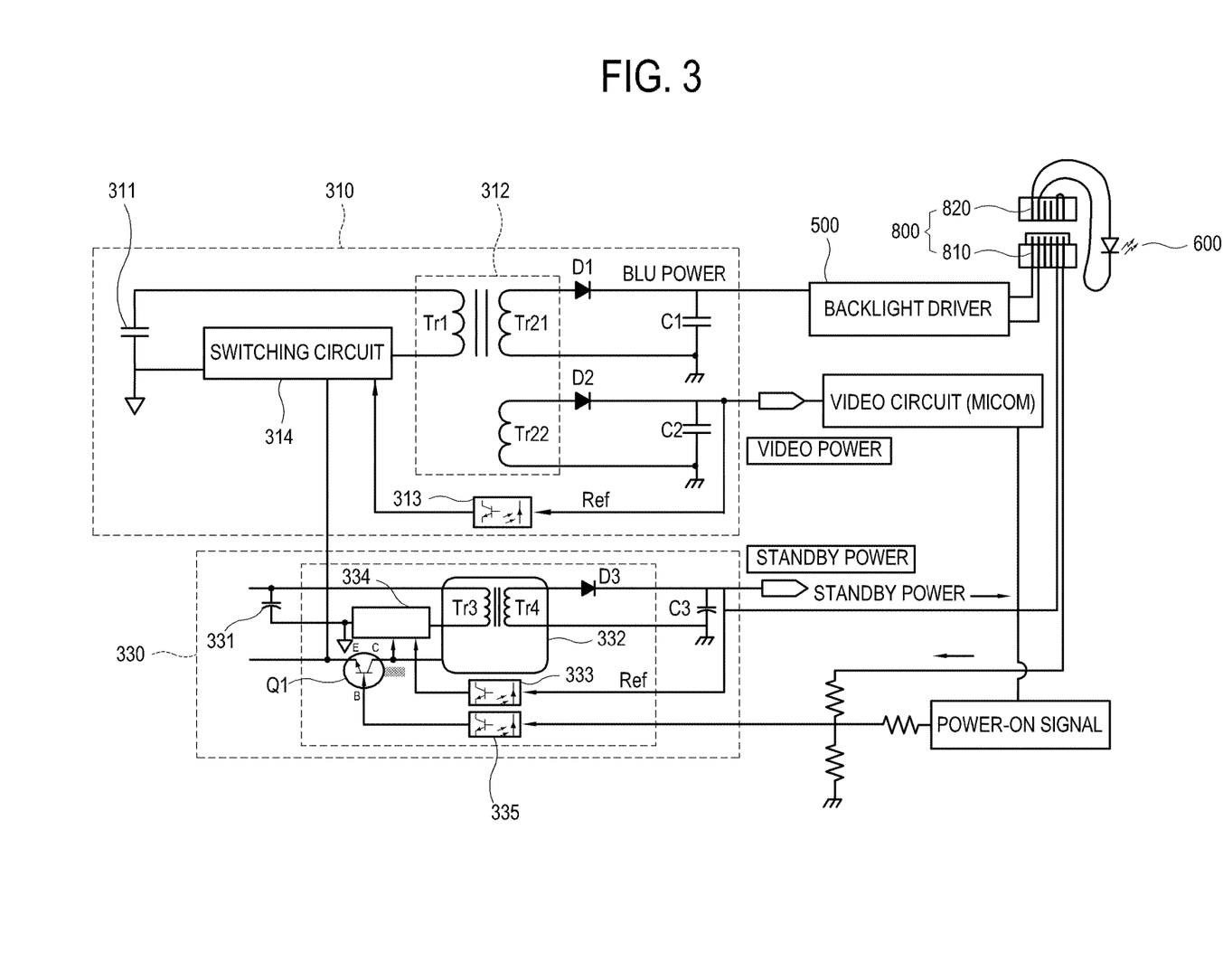
FIG. 3 is a circuit diagram illustrating power connections according to an exemplary embodiment.

As shown in FIG. 3, the main power supply 310 may include a smoothing condenser 311, a transformer 312, a feedback circuit 313, and a switching circuit 314. The transformer 312 includes secondary coils Tr21 and Tr22 to which diodes D1 and D2 are respectively connected in series and capacitors C1 and C2 are respectively connected in parallel, thereby constituting the output terminal for the control voltage.

Further, the main power supply 310 may additionally include a rectifier circuit anterior to the smoothing condenser 311. The rectifier circuit may be, for example, a bridge rectifier circuit configured to rectify an external AC voltage into a direct current (DC) voltage.

The smoothing condenser 311 smoothes the DC voltage output from the rectifier circuit, and the DC voltage is input to the primary coil Tr1 of the transformer 312.

The transformer 312 transforms the DC voltage input to the primary coil Tr1 into predetermined voltages at secondary coils Tr21 and Tr22. The voltages are transformed by certain integer ratios, thereby outputting the transformed voltages to the backlight driver 600 and the video circuit 400, respectively.

The feedback circuit 313 may include a photo coupler so as to feed the voltage at the secondary side of the transformer 312 back to the primary side.

The switching circuit 314 may apply pulse width modulation (PWM) to control the voltage at the primary side Tr1 of the transformer 312 in accordance with the feedback signal of the feedback circuit 313. The switching circuit 314 may be achieved by a pulse width control integrated circuit (IC) and a field effect transistor (FET) switch.

The standby power supply 330 may include a smoothing condenser 331, a transformer 332, a feedback circuit 333, a switching circuit 334, an enabling circuit 335, and a transistor switch Q1. A secondary coil Tr4 of the transformer 332 connects with a diode D3 in series and connects with a capacitor C3 in parallel, thereby constituting an output terminal for a standby voltage.

Further, the standby power supply 330 may additionally include a rectifier circuit anterior to the smoothing condenser 331. The rectifier circuit may be, for example, a bridge rectifier circuit configured to rectify an external AC voltage into a DC voltage.

The smoothing condenser 331 smoothes the DC voltage output from the rectifier circuit, and the DC voltage is input to the primary coil Tr3 of the transformer 332.

The transformer 332 transforms the DC voltage input to the primary coil Tr3 into predetermined voltages at the secondary coil Tr4 by respective certain integer ratios, thereby outputting the standby voltage from the secondary coil Tr4.

The feedback circuit 333 may include a photo coupler so as to feed the voltage at the secondary side of the transformer 332 back to the primary side.

The switching circuit 334 may apply PWM control to the voltage at the primary side Tr3 of the transformer 332 in accordance with the feedback signal of the feedback circuit 333. The switching circuit 334 may be achieved by, for example, a pulse width control IC and an FET switch.

The enabling circuit 335 may include a photo coupler to turn on or off the standby power of the standby power supply 330 applied to the switching circuit 314 of the main power supply 310.

The transistor switch Q1 is arranged in between the output terminal of the standby power supply 330 and the switching circuit 314 of the main power supply 310, so as to control switching of the switching circuit 314 with the standby power. The transistor switch Q1 may be achieved by various semiconductor switches such as an FET switch, etc.

The standby power output from the standby power supply 330 is connected to a collector C of the transistor switch Q1. An emitter E of the transistor switch Q1 is connected to the switching circuit 314 of the main power supply 310. The base B of the transistor switch Q1 is connected to the output terminal of the enabling circuit 335.

Figure 4:
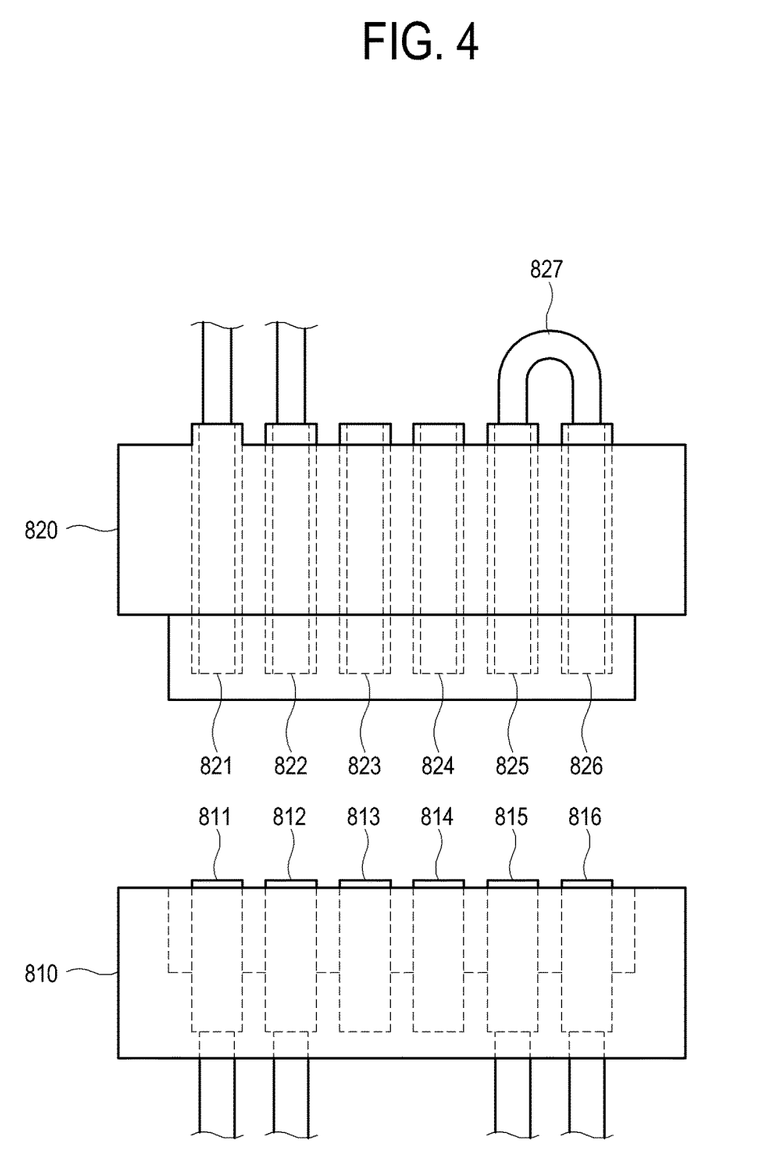
FIG. 4 is a diagram illustrating a wire harness according to an exemplary embodiment.

As shown in FIG. 4, a first wire harness 810 of the backlight driver 500 includes terminals 811-816 and a second wire harness 820 of the backlight 600 includes terminals 821-826. The output terminal of the transformer 332 at the secondary side is connected to a fifth terminal 815 of the first wire harness 810 connecting with the second wire harness 820. A sixth terminal 816 of the first wire harness 810 is connected to the bias control-voltage input terminal of the enabling circuit 335. The fifth terminal 815 and sixth terminal 816 of the first wire harness 810 may use terminals other than the terminals 811 and 812 used in connecting the backlight driver 500 and the backlight 600. The fifth terminal 825 and sixth terminal 826 of the second wire harness 820 corresponding to the fifth terminal 815 and sixth terminal 816 of the first wire harness 810 are connected and short-circuited by a short-circuit wire 827.

When the first wire harness 810 of the backlight driver 500 is coupled to the second wire harness 820, not only is the control voltage of the backlight driver 500 supplied to the backlight 600, but the standby voltage of the standby power supply 330 is also supplied to the bias control-voltage input terminal of the enabling circuit 335 via the fifth terminal 815 of the first wire harness 810, the fifth terminal 825 of the second wire harness 820, the sixth terminal 826 of the second wire harness 820 and the sixth terminal 816 of the first wire harness 810.

Thus, the standby voltage of the standby power supply 330 is supplied to the bias control-voltage input terminal of the enabling circuit 335 in accordance with a connection between the backlight driver 500 and the backlight 600.

Thereby, the transistor switch Q1 can be turned on to thereby operate the switching circuit 314 of the main power supply 310 with the standby power.

Further, the video circuit 400 is connected to the bias input terminal of the enabling circuit 335, and thus the power-on signal is supplied from the microcomputer so that the transistor switch Q1 can be turned on to thereby operate the switching circuit 314 of the main power supply 310 with the standby power.

As described above, if the video circuit 400 and the backlight 600 are not mounted in the assembling process or the test process, the transistor switch Q1 is always turned off because the default standby power or the power-on signal is not applied to the enabling circuit 335, thereby preventing the circuit component from damage.

If only the video circuit 400 is mounted without the backlight 600, the main power supply 310 may be operated by the power-on signal of the video circuit 400.

Figure 5:
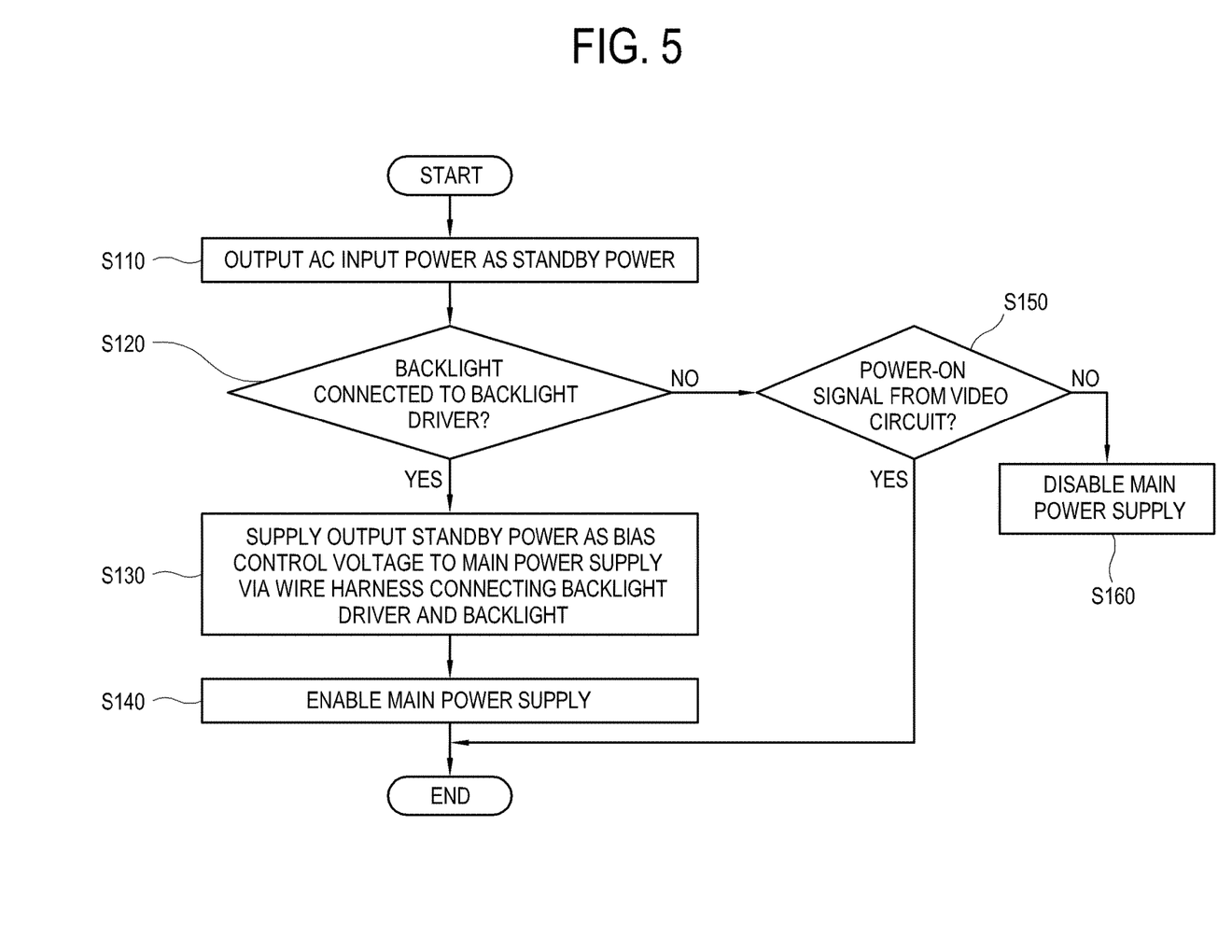
FIG. 5 is a flowchart illustrating a power supplying method according to an exemplary embodiment.

Below, the power supplying method of the display apparatus 100 according to an exemplary embodiment will be described with reference to FIG. 5.

At operation S110, if AC power is connected, the standby power is output by the smoothing condenser 331, the transformer 332, the feedback circuit 333 and the switch circuit 334.

At operation S120, it is determined whether the backlight driver 500 is connected to the backlight 600.

If it is determined at operation S120 that the first wire harness 810 of the backlight driver 500 is connected to the second wire harness 820 of the backlight 600, at operation S130, the output standby power is supplied to the bias control-voltage input terminal of the enabling circuit 335 via the wire harness 800 of connecting the backlight driver 500 and the backlight 600 and the transistor switch Q1 is turned on, and at operation S140 the main power supply 310 is turned on.

If it is determined at operation S120 that the first wire harness 810 of the backlight driver 500 is not connected to the second wire harness 820 of the backlight 600, at operation S150 it is determined whether the power-on signal from the video circuit 400 is applied to the bias control-voltage input terminal of the enabling circuit 335.

If it is determined at operation S150 that the power-on signal is received from the video circuit 400, the transistor switch Q1 is turned on, and at operation S140 the main power supply 310 is enabled. If it is determined at operation S150 that the power-on signal is not received from the video circuit 400, the transistor switch Q1 is turned off, and at operation S160 the main power supply 310 is disabled.

According to an exemplary embodiment, the display apparatus disables the main power supply, and thus prevents the circuit component, such as the capacitor, from damage even though the AC power is connected while the video circuit and the backlight are not connected.

Although a few exemplary embodiments have been shown and described, it will be appreciated by those skilled in the art that changes may be made in these exemplary embodiments without departing from the principles and spirit of the exemplary embodiments. Therefore, the foregoing has to be considered as illustrative only. The scope of the present disclosure is defined in the appended claims and their equivalents. Accordingly, all suitable modification and equivalents may fall within the scope of the present disclosure.

What is claimed is:

1. A display apparatus for displaying an image, the display apparatus comprising:
   a backlight;
   a backlight driver configured to drive the backlight to emit light, the backlight driver comprising a connector to which the backlight is attachable;
   a main power supply configured to supply a driving voltage to the backlight driver in response to a control voltage;
   a standby power supply configured to:
      supply a standby voltage to the connector;
      detect connection of the backlight to the backlight driver according to whether the backlight is attached to the connector based on the standby voltage received via the connector; and
      supply the control voltage to the main power supply, in response to detecting the connection of the backlight to the backlight driver,
   wherein the standby power supply does not supply the control voltage to the main power supply, in response to detecting disconnection of the backlight to the backlight driver according to the backlight not being attached to the connector.

2. The display apparatus according to claim 1, wherein the standby power supply is further configured to determine whether a video circuit is connected to the display apparatus, and supply the control voltage in accordance with a result of the determination.

3. The display apparatus according to claim 1, wherein the standby power supply is further configured to determine whether a video circuit is connected to the display apparatus and supply a power-on signal to the video circuit in accordance with a result of the determination.

4. The display apparatus according to claim 1, wherein the connector includes a wire harness comprising a first side and a second side,
   the first side of the wire harness comprises a first terminal connected to an output terminal of the standby power supply and a second terminal connected to a bias control-voltage input terminal of the main power supply,
   the second side of the wire harness comprises a third terminal configured to be coupled to the first terminal and a fourth terminal configured to be coupled to the second terminal, and
   the third terminal and the fourth terminal are directly electrically connected to each other.

5. A power supplying method of a display apparatus comprising a backlight, a backlight driver comprising a connector to which the backlight is attachable, a standby power supply and a main power supply, the power supplying method comprising:
   by the standby power supply, supplying a standby voltage to the connector;
   by the standby power supply, detecting connection of the backlight to the backlight driver according to whether the backlight is attached to the connector based on the standby voltage received via the connector; and
   by the standby power supply, supplying a control voltage to the main power supply in response to detecting the connection of the backlight to the backlight driver, and not supplying the control voltage to the main power supply, in response to detecting disconnection of the backlight to the backlight driver according to that the backlight is not attached to the connector.

6. The power supplying method according to claim 5, further comprising determining whether a video circuit is connected to the display apparatus, and supplying the control voltage in accordance with a result of the determining.

7. A display apparatus comprising:
a backlight;
a backlight driver configured to drive the backlight;
a wire harness comprising a first side and a second side configured to connect the backlight to the backlight driver;
a main power supply; and
a standby power supply configured to:
   supply a standby voltage to the first side to the second side of the wire harness,
   detect connection of the backlight to the backlight driver according to whether the backlight is attached to the wire harness based on the standby voltage received via the wire harness, and
   supply a control voltage to the main power supply, in response to detecting the connection of the backlight to the backlight driver,
wherein the standby power supply does not supply the control voltage to the main power supply, in response to detecting disconnection of the backlight to the backlight driver according to that the backlight is detached from the wire harness.

8. The display apparatus of claim 7, wherein the standby power supply is further configured to activate the main power supply in response to receiving the standby voltage from the wire harness.

9. The display apparatus of claim 8, further comprising a video circuit configured to generate an activation signal,
   wherein the standby power supply is further configured to activate the main power supply in response to receiving the activation signal received from the video circuit.

10. The display apparatus of claim 9, wherein the video circuit comprises a remote-controller light receiver configured to generate an indicator signal in response to receiving a power command from a remote control,
   the video circuit is further configured to generate the activation signal in response to the indicator signal.

* * * * *